US010231094B2

(12) United States Patent
Weidenfeller (10) Patent No.: US 10,231,094 B2
(45) Date of Patent: Mar. 12, 2019

(54) REPORT-BASED CONTROL OF REPEATED MULTICAST DATA TRANSMISSION (71) Applicant: Telefonaktiebolaget LM Ericsson (publ), Stockholm (SE)

(72) Inventor: Thomas Weidenfeller, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/124,186

(22) PCT Filed: Mar. 4, 2014

(86) PCT No.: PCT/EP2014/054133
§ 371 (c)(1),
(2) Date: Sep. 7, 2016

(87) PCT Pub. No.: WO2015/131927
PCT Pub. Date: Sep. 11, 2015

(65) Prior Publication Data
US 2017/0230804 A1 Aug. 10, 2017

(51) Int. Cl.
H04W 4/06 (2009.01)
H04L 12/18 (2006.01)
H04L 29/06 (2006.01)
H04W 12/10 (2009.01)

(52) U.S. Cl.
CPC ............. *H04W 4/06* (2013.01); *H04L 12/189* (2013.01); *H04L 12/1863* (2013.01); *H04L 63/123* (2013.01); *H04W 12/10* (2013.01); *H04L 63/104* (2013.01)

(58) Field of Classification Search
CPC .... H04W 4/06; H04W 12/10; H04L 12/1863; H04L 63/123; H04L 12/189; H04L 63/104
See application file for complete search history.

(56) References Cited

U.S. PATENT DOCUMENTS

2010/0039977 A1* 2/2010 Hikari ................ H04L 47/10
370/312

FOREIGN PATENT DOCUMENTS

FR 2893472 A1 5/2007
WO 9826541 A1 6/1998

OTHER PUBLICATIONS

3rd Generation Partnership Project, "Universal Mobile Telecommunications System (UMTS); LTE; Multimedia Broadcast/Multicast Service (MBMS); Architecture and functional description", Technical Specification, ETSI TS 123 246 V9.6.0 (3GPP TS 23.246 version 9.6.0 Release 9), Jan. 1, 2012, pp. 1-67, ETSI.

(Continued)

Primary Examiner — Ian N Moore
Assistant Examiner — Justin T Van Roie
(74) Attorney, Agent, or Firm — Coats & Bennett, PLLC (57) ABSTRACT A network node initiates a multicast transmission of a data item via a cellular network to a plurality of devices. Associated with the multicast transmission, the network node provides a request that at least a subgroup of the devices each send a report indicating whether an action on the basis of the data item received by the device was successfully completed by the device. Depending on the reports, the network node adjusts the repeated multicast transmission of the data item.

20 Claims, 6 Drawing Sheets (56) References Cited

OTHER PUBLICATIONS

3rd Generation Partnership Project, "Universal Mobile Telecommunications System (UMTS); LTE; Multimedia Broadcast/Multicast Service (MBMS); Protocols and codecs", Technical Specification, ETSI TS 126 346 V9.3.0 (3GPP TS 26.346 version 9.3.0 Release 9), Jun. 1, 2010, pp. 1-152, ETSI.

Holland, O., et al., "Dynamic Switching Between One-to-Many Download Methods in "All-IP" Cellular Networks", IEEE Transactions on Mobile Computing, Mar. 1, 2006, pp. 274-287, vol. 5, No. 3, IEEE.

* cited by examiner

REPORT-BASED CONTROL OF REPEATED MULTICAST DATA TRANSMISSION

TECHNICAL FIELD

The present invention relates to methods for transmitting a data item and to corresponding devices.

BACKGROUND

In cellular networks, e.g., as specified by 3GPP ($3^{rd}$ Generation Partnership Project), multicast and broadcast transmission modes have been introduced, e.g., for the purpose of delivering multimedia content. Examples of such broadcast and multicast transmission modes are the Multimedia Broadcast Multicast Service (MBMS) and evolved Multimedia Broadcast Multicast Service (eMBMS), e.g., as specified in 3GPP TS 22.346 V11.0.0 (2012-09), 3GPP TS 23.246 V12.0.0 (2013-12) and 3GPP TS 26.346 V12.0.0 (2013-12).

The MBMS and eMBMS technologies may be used for efficiently delivering a data item to a plurality of devices. In addition to delivery of multimedia content, one usage scenario mentioned in 3GPP TS 22.346 is downloading of upgraded software to a device. In such cases, it may be necessary to repeat the broadcast or multicast transmission to give as many devices as possible the opportunity to receive the upgraded software.

However, since the repetition of a broadcast or multicast transmission requires network resources, it is desirable to avoid excessive repetitions. On the other hand, only limited possibilities exist to assess on the network side whether it is appropriate to continue with further repetitions of a broadcast or multicast transmission.

In section 9.4 of 3GPP TS 26.346 a reception reporting procedure for MBMS and eMBMS is specified. The reception reporting procedure allows for indicating to a network entity, referred to as Broadcast Multicast Service Centre (BM-SC), that a download of one or more files via MBMS or eMBMS is complete. However, in the case of delivering a software upgrade via MBMS or eMBMS, this information may be insufficient for deciding whether it is appropriate to continue with further repetitions of a broadcast or multicast transmission. For example, the installation of the software upgrade may have been interrupted on some of the devices which have successfully received the software upgrade, and such devices may need to receive the software update again.

Accordingly, there is a need for techniques which allow for efficiently managing a repeated broadcast or multicast transmission of a data item.

SUMMARY

According to an embodiment of the invention, a method of transmitting a data item is provided. According to the method, a network node initiates a multicast transmission of the data item via a cellular network to a plurality of devices. Associated with the multicast transmission, the network node provides a request that at least a subgroup of the devices each send a report indicating whether an action on the basis of the data item received by the device was successfully completed by the device. Depending on the reports, the network node adjusts the repeated multicast transmission of the data item.

According to a further embodiment of the invention, a method of transmitting a data item is provided. According to the method, a device receives a multicast transmission of the data item via a cellular network. Associated with the multicast transmission, the device receives a request to send a report indicating whether an action on the basis of the received data item was successfully completed by the device. Further, the device initiates the action and, depending on whether the action was successfully completed, sends the report.

According to a further embodiment of the invention, a network node is provided. The network node comprises at least one interface with respect to one or more nodes of a cellular network. Further, the network node comprises at least one processor. The at least one processor is configured to initiate a repeated multicast transmission of a data item via the cellular network to a plurality of devices. Further, the at least one processor is configured to provide, associated with the multicast transmission, a request that at least a subgroup of the devices each send a report indicating whether an action on the basis of the data item received by the device was successfully completed by the device. Further, the at least one processor is configured to adjust, depending on the reports, the repeated multicast transmission of the data item.

According to a further embodiment of the invention, a device is provided. The device comprises a radio interface for communication with a cellular network. Further, the device comprises at least one processor. The at least one processor is configured to receive a multicast transmission of a data item via a cellular network. Further, the at least one processor is configured to receive, associated with the multicast transmission, a request to send a report indicating whether an action on the basis of the received data item was successfully completed by the device. Further, the at least one processor is configured to initiate the action and, depending on whether the action was successfully completed, send the report.

According to a further embodiment of the invention, a computer program or computer program product is provided, e.g., in the form of a non-transitory storage medium, which comprises program code to be executed by at least one processor of a network node. Execution of the program code causes the at least one processor to initiate a repeated multicast transmission of a data item via a cellular network to a plurality of devices. Further, execution of the program code causes the at least one processor to provide, associated with the multicast transmission, a request that at least a subgroup of the devices each send a report indicating whether an action on the basis of the data item received by the device was successfully completed by the device. Further, execution of the program code causes the at least one processor to adjust, depending on the reports, the repeated multicast transmission of the data item.

According to a further embodiment of the invention, a computer program or computer program product is provided, e.g., in the form of a non-transitory storage medium, which comprises program code to be executed by at least one processor of a device. Execution of the program code causes the at least one processor to receive a multicast transmission of a data item via a cellular network. Further, execution of the program code causes the at least one processor to receive, associated with the multicast transmission, a request to send a report indicating whether an action on the basis of the received data item was successfully completed by the device. Further, execution of the program code causes the at least one processor to initiate the action and, depending on whether the action was successfully completed, send the report.

Details of such embodiments and further embodiments will be apparent from the following detailed description of embodiments

DETAILED DESCRIPTION OF EMBODIMENTS

In the following, concepts according to embodiments of the invention will be explained in more detail by referring to the accompanying drawings. The illustrated concepts relate to transmission of a data item to a plurality of devices, using a multicast or broadcast transmission mode of a cellular network. In the illustrated embodiments, it is assumed that the cellular network is based on the LTE (Long Term Evolution) technology as specified by 3GPP, and the multicast or broadcast transmission mode is based on eMBMS. However, it is to be understood that the illustrated concepts could be applied in a corresponding manner to other cellular network technologies supporting multicast or broadcast transmission modes, e.g., UMTS (Universal Mobile Telecommunications System) or GSM (Global System for Mobile Communications) in connection with GPRS (General Packet Radio Service) and MBMS. The devices may for example be mobile phones or portable computer devices. Further, the devices may correspond to vehicles, sensors, vending machines, or other kinds of connected devices. In the following the devices will also be referred to as end devices.

In the concepts as illustrated herein, a repeated multicast or broadcast transmission of a data item via the cellular network is used to deliver the data item to the plurality of end devices. In this connection, a multicast transmission is considered to be a transmission which is destined to a plurality of recipients. A broadcast transmission is considered to be a transmission which is destined to all recipients in a given coverage area of the cellular network, e.g., in an MBMS service area. The broadcast transmission may therefore be regarded as a specific case of a multicast transmission. Accordingly, in the following the term "multicast transmission" will be used as covering both the case of a multicast transmission and the specific case of a broadcast transmission, unless indicated otherwise. In accordance with the LTE technology underlying the illustrated examples, such multicast transmission may also be referred to as eMBMS transmission. For the LTE technology, 3GPP TS 23.246 V11.0.0 specifies that a Broadcast Mode is supported. For the GPRS technology also a Multicast Mode is supported, in which it is possible to limit the group of end devices to which the multicast transmission is addressed. In the illustrated scenarios based on the LTE technology, the "multicast transmission" may correspond to an eMBMS transmission in Broadcast Mode. The delivery of the data item may involve downloading of the data item or streaming of the data item.

Associated with the multicast transmission, a request is provided which indicates that at least a subgroup of the end devices having received the multicast transmission with the data item shall send a report whether an action on the basis of the received data item was successfully completed by the device. Accordingly, not merely successful reception of the data item is requested to be reported, but further processing of the data item in the form of successfully completing the action. This action may for example be installation of program code included in the data item at the end device, e.g., installation of a software upgrade, and/or configuration of the end device with the configuration data. The action may also be execution of one or more commands included in the data item, e.g., commands for deleting data or software. The request may be provided in the form of an additional information item in the multicast transmission. Alternatively, the request could be transmitted separately from the multicast transmission with the data item, e.g., in a further multicast transmission, which may be sent earlier or later than the multicast transmission. Such a separate further multicast transmission may also be addressed to a smaller number of recipients than the multicast transmission with the data item. If the request is transmitted separately from the multicast transmission with the data item, it may for example include an identifier of the multicast transmission with the data item, to thereby associate the request with this multicast transmission. In the following, the request will also be referred to as Request to React (RTR).

In particular, a target success rate for the action may be defined, and the reports provided by the end devices may be used to measure an actual success rate of completing the action by the end devices. The actual success rate may then be compared to the target success rate, and the repeated multicast transmission may be adjusted depending on this comparison, e.g., by stopping the repeated multicast transmission if the target success rate is reached.

The report may be requested from all end devices which have received the multicast transmission with the data item, or may be requested from only a subgroup of these end devices, e.g., a subgroup which constitutes a statistically relevant fraction of the intended recipients of the data item. In this way, resource usage due to the reporting may be reduced significantly. The RTR may indicate one or more selection criteria for defining such subgroup, and each end device may evaluate such selection criteria to determine whether it shall send the report or not. If the RTR indicates multiple selection criteria, it may also indicate one or more logical operators relating these criteria. For example, such logical operator may be an AND operator which indicates that all of multiple criteria need to be fulfilled by the end device to be member of the subgroup which is requested to send the report. Another example is an OR operator which indicates that at least one of multiple criteria need to be fulfilled by the end device to be member of the subgroup which is requested to send the report. Still another example is a NOT operator, which indicates that a certain criterion may not be fulfilled by the end device to be member of the subgroup which is requested to send the report. Still further examples are an XOR (exclusive OR) operator, a NAND (Negated AND) operator, or a NOR (Negated OR) operator.

The above-mentioned selection criteria may for example include a range of a serial number of the end devices, one or more specific digits of the serial number, e.g., all end devices having a serial numbers ending in a 6. Such serial number may relate to the overall device, e.g., the entire vehicle, or may relate to a component of the end device, e.g., to an electronic system in the device, such as a navigation system or entertainment system of a vehicle. Further selection criteria may include an IMEI (International Mobile Equipment Identity) or IMSI (International Mobile Subscriber Identity) associated with the communication module of the end device. Further, such selection criteria may include a geographic location or area, e.g., to specify that end devices in a certain geographical area shall send the report. Further, such selection criteria may also include parameters related to an operational status of the end device, e.g., an uptime. In the case of vehicles, such selection criteria may also include a chassis number or engine number. Further, such selection criteria may be service related, e.g., may specify a time interval since the last upgrade, an in-service time, an out-of-service time, customer service level, or the like. Further, such selection characteristics may relate to an application environment of the end device, e.g., specify the owner, user, or operator of the end device. Further, such selection criteria may relate to a provider of the end device, e.g., specify a manufacturer or supplier of the end device. Further, the RTR may also specify a quota of devices which shall send the report, e.g., as a percentage value.

Various formats may be used to indicate such selection criteria in the RTR. For example, a table or list may be used, in which each row identifies a criterion, such as geographic area, and further includes parameters specifying this criterion, such as geographic coordinates. Still further, such row may include references to other rows which are to be combined with this row by a certain logical operator, such as AND, OR, NOR, or the like.

The RTR may also indicate how the end device should react, i.e., how the report shall be sent. For example, the RTR may specify conditions for triggering sending of the report, e.g., defining when or where to send the report. Such conditions may for example be used to specify that the report shall be sent at a given time of the day, e.g., during times of low network load, or when the end device is at a given location, e.g., in region with good network coverage. Further, the RTR may specify one or more transmission methods to be used for sending the report, e.g., SMS (Short Message Service) or an IP (Internet Protocol) based transmission method, such as HTTPS (Hypertext Transfer Protocol Secure) or electronic mail. The RTR may also indicate one or more target addresses to which the report shall be sent, e.g., as a target telephone number for sending an SMS, as an IP address, or as a URI (Uniform Resource Identifier). The RTR may also indicate how the end device shall select one or more transmission methods and/or target addresses to be utilized for sending the report. For example, the RTR could indicate that the end device shall utilize the first one that it is capable of using, or that works, or utilize all of them, or any other combination. The RTR may also specify one or more formats in which the report shall be sent, e.g., a format based on XML (Extensible Markup Language).

The above-mentioned selection criteria may also be used as criteria for specifying how the report shall be sent. This may for example be implemented by providing one or more rows in the above-mentioned table or list, each which identify such reporting criterion, specify one or more parameters of such criterion, and optionally references to other with reporting criteria rows which are to be combined with this row by a certain logical operator, such as AND, OR, NOR, or the like.

The RTR may also indicate a key for authenticating the report. The end device sending the report may for example use this key to sign or encrypt the report, or to sign or encrypt a device-specific secret attached to the report, or to sign and encrypt the report and a device-specific secret attached to the report, or consider the key as a challenge as part of a challenge-response authentication for which the report needs to contain a matching response or a matching response attached to the report. In this way, manipulation of the reporting procedure may be hindered.

These concepts allow for efficiently reporting information related to the multicast transmission with the data item. In particular, such information may be highly valuable when deciding whether or how to continue with the repeated multicast transmission of the data item. An exemplary use cases is sending a multicast transmission with a firmware upgrade to all end devices of a certain type, without distinguishing between a premium and non-premium classification of the end devices, and defining the reporting subgroup in such a way that the success rate is measured for the end devices having a premium classification. Such subgroup could be even further limited, e.g., by indicating in the RTR that only a certain quota of the end devices having a premium classification shall send the report, that only the end devices having a premium classification and located in a certain geographical area shall send the report, or that the end devices having a premium classification and an uptime in a given range, e.g., less than two weeks, shall send the report. Then all end devices would be enabled to receive the upgrade through the multicast transmission, but only the reports from the specific subgroup would be utilized in the process of deciding whether the repeated broadcast needs adjustment. Thereby, the resource utilization by the repeated multicast transmission can be tailored in view of the needs of premium customers. Nonetheless, non-premium customers may be efficiently served at the same time.

Further details of the concepts and exemplary implementations will now be explained with reference to the accompanying drawings.

Figure 1:
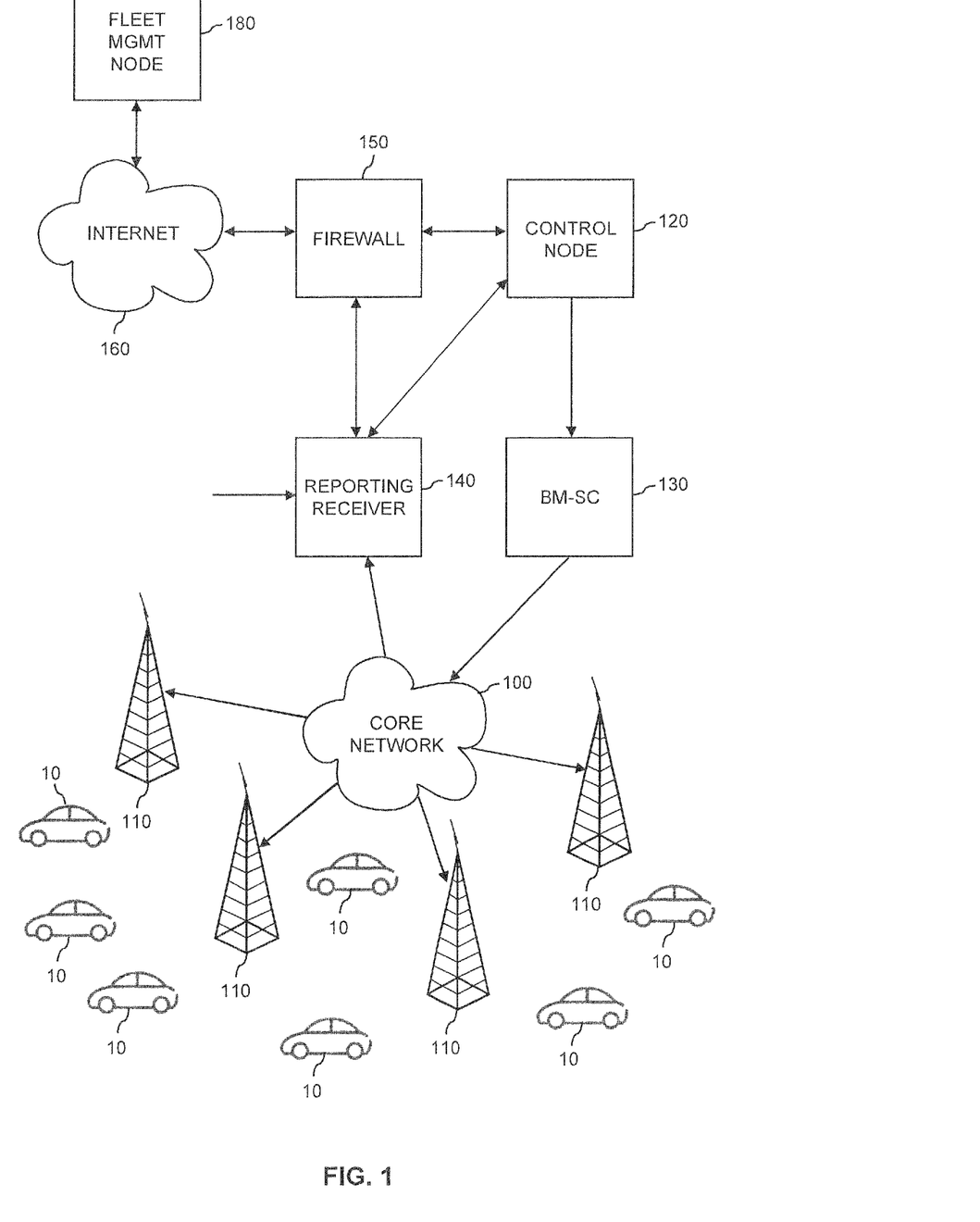
FIG. 1 schematically illustrates an exemplary architecture for implementing multicast transmission of a data item according to an embodiment of the invention.

FIG. 1 schematically illustrates an exemplary architecture which may be used for implementing the concepts. The illustrated architecture enables multicast transmissions of a data item over the cellular network, represented by a core network 100 and base stations 110. In accordance with the assumed LTE scenario, the base stations 110 may be LTE base stations, referred to as eNB ("evolved Node B"), the core network 100 may correspond to the LTE Evolved Packet Core (EPC), and the multicast transmissions may correspond to eMBMS transmissions in Broadcast Mode. The multicast transmissions are managed by a BM-SC 130. The BM-SC 130 may have functionalities as for example specified in 3GPP TS 23.246. In the scenario of FIG. 1, the end devices acting as recipients of the multicast transmission with the data item are illustrated as vehicles 10. For example, these vehicles 10 may be part of a vehicle fleet, e.g., owned by a certain company and/or supplied by a certain manufacturer. The connection of the vehicles to the cellular network may be provided by a correspondingly equipped communication module in each of the vehicles 10.

In addition, the illustrated architecture provides a control node 120 and a reporting receiver 140. In the illustrated implementation, the control node 120 and the reporting receiver 140 are assumed to be part of the cellular network infrastructure. Further, the illustrated architecture provides a firewall 150 through which the control node 120 and/or the reporting receiver 140 may be accessed over the Internet 160. This may help to ensure security of the cellular network infrastructure. In the illustrated example, a fleet management node 180 may use such access for managing and/or configuring the control node 120 and/or the reporting receiver 140 with respect to the functionalities as described herein. For example, an operator may decide that a software upgrade should be installed in the vehicles 10 and use the fleet management node 180 for configuring the control node 120 and/or reporting received 140 accordingly. This may for example include providing the data item with the software upgrade to the control node 120 and setting up the reporting receiver 140 to receive and aggregate reports from the vehicles 10.

Figure 2:
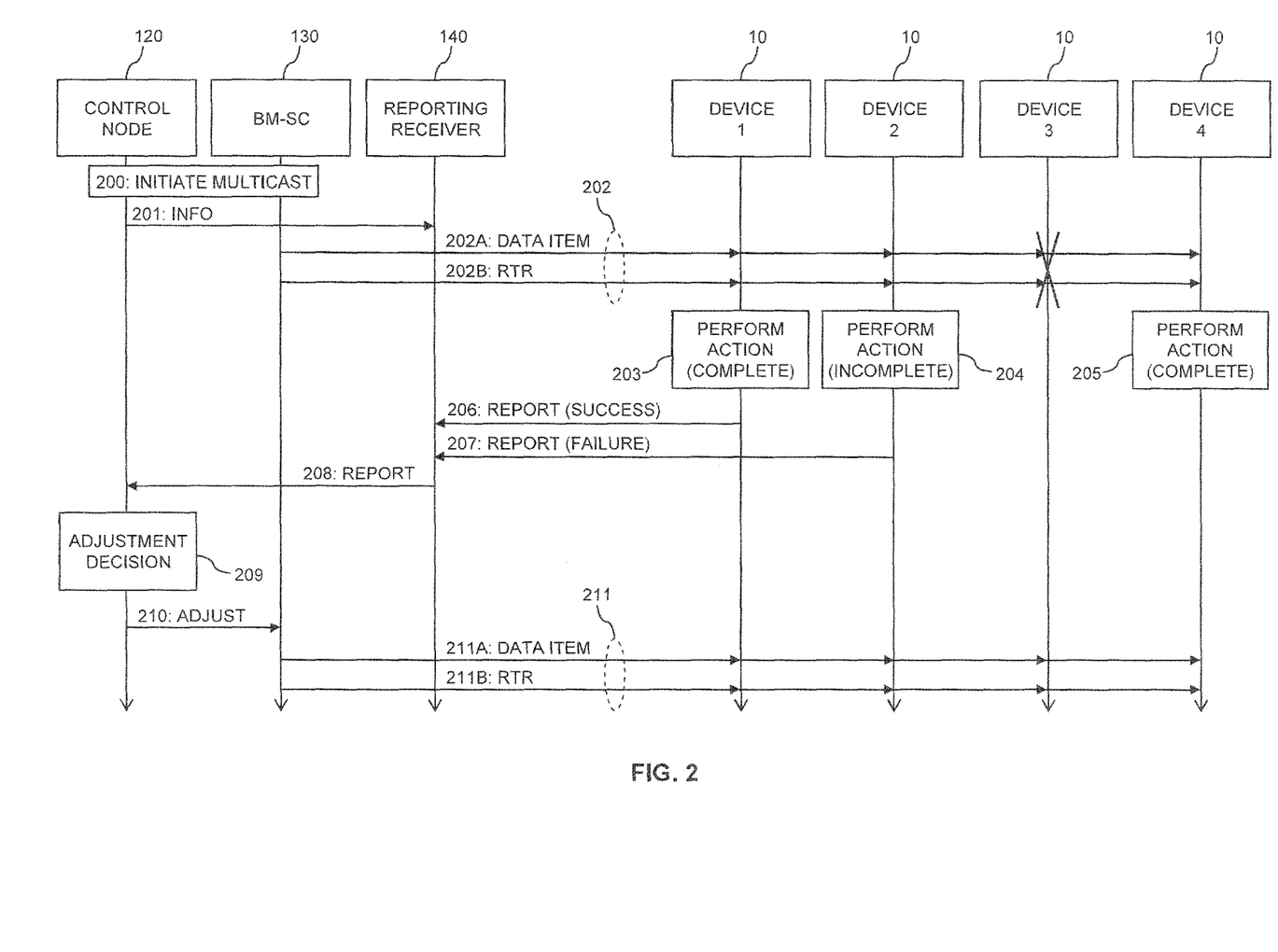
FIG. 2 schematically illustrates exemplary processes according to an embodiment of the invention.

In an exemplary usage scenario, the architecture of FIG. 2 may be used for providing a software upgrade to the vehicles 10. Such firmware upgrade may relate to any computerized system in the vehicle 10, e.g., motor electronics, navigation system, entertainment system, or the like. Such software upgrade may also relate to the communication module which is used for connecting the vehicle 10 to the cellular network.

In such usage scenario, at the beginning of a new upgrade campaign, the control node 120 is provided with the data item including the firmware upgrade to be installed in the vehicles 10. Further, the control node 120 is configured with the target success rate for the software upgrade, the criteria defining the subgroup for which the success rate of the software upgrade is to be monitored, and an initial repeat rate of the multicast transmission with the software upgrade. Further, the control node 120 may also be configured with a maximum number of repetitions for the multicast transmission with the software upgrade. This may be accomplished by a fleet manager through the fleet management node 180.

Various criteria may be used by the fleet manager for defining the target success rate and the subgroup for monitoring the success rate, such as a business value of the upgrade, an urgency of the upgrade, a customer classification as premium or non-premium, or the like. A limit to the target success rate may be defined by the knowledge that a 100% success rate is typically unrealistic. For example, a certain portion of the vehicles 10 may be out of reach for the upgrade campaign, e.g., due to being out of order, outside of network coverage, temporarily out of usage, or the like. A realistic target success rate can be determined by considering the actual success rate of previous upgrade campaigns. Corresponding information may for example be obtained from the reporting receiver 140.

Similarly, the initial repeat rate may be determined by considering previous upgrade campaigns, e.g., by considering a timing of reported upgrade successes after sending the multicast transmission with the software upgrade. An excessive initial repeat rate may be inefficient in view of network resource usage and costs. Accordingly, the initial repeat rate may be set in such a way that a certain amount of successful upgrades can be expected in the time interval between two successive repetitions.

The maximum number of repetitions may be used to provide an "emergency break", protecting from endless repetitions in cases where the target success rate cannot be reached for some reason.

Once the control node 120 and the reporting receiver 140 are configured and the first multicast transmission of the software upgrade is due, the control node 120 initiates sending of the multicast transmission by the BM-SC 130. In particular, this may involve initiating the BM-SC 130 to conduct an MBMS session start procedure as specified in 3GPP TS 23.246. The BM-SC 130 may then in turn initiate activation of required bearer resources in the cellular network and notification of the recipients, i.e., the vehicles 10, of the MBMS session.

The control node 120 may then waits for a certain time before sending the software upgrade as MBMS content to the BM-SC 130. This time may correspond to at least the time which the BM-SC 130 is configured to wait before sending MBMS data of the started MBMS session. That is to say, the control node 120 may wait until the BM-SC 130 is ready to send the multicast transmission with the software upgrade. In this way, buffering of content by the BM-SC 130 may be avoided.

The control node 120 then sends a data file with the software upgrade to the BM-SC 130. The control node 120 also associates this data file with the RTR which specifies the reporting of the upgrade success by the vehicles 10. This may for example be achieved by including the RTR into the data file, e.g., by prepending or appending it to the data of the software upgrade. Further, the control node 120 also indicates a time schedule according to which multicast transmissions including the data file as content shall be performed. This time schedule is defined by the initial repeat rate and maximum number of repetitions. From the perspective of the BM-SC 130 the control node 120 may act as a content provider. The repeated multicast transmissions may be sent in the same MBMS session, or the BM-SC 130 may autonomously start a new MBMS session for each repetition. The latter alternative may for example be used in the case of longer time intervals between two successive repetitions.

The reporting receiver 140 collects the reports provided by the vehicles 10 and may forward them to the control node 120. This forwarding may also involve aggregation of multiple reports to a more condensed report. For example, the reception receiver could evaluate multiple reports and then indicate the current number of successful upgrades to the control node. The reporting receiver 140 may provide one or more interfaces for receiving the reports from the vehicles. Such interfaces may for example use an IP based protocol, such as HTTPS or electronic mail, or may use a messaging service supported by the cellular network, such as SMS or an IMS (IP Multimedia Subsystem) messaging service.

To increase efficiency of collecting the report, the control node 120 may inform the reporting receiver 140 on the upgrade campaign in general or on the individual scheduled multicast transmissions. The reporting receiver 140 may then manage its operations accordingly, e.g., by activating required interfaces in time periods where reports can be expected.

Depending on the received reports, the control node 120 decides whether the repeated multicast transmission as configured in the BM-SC 130 requires adjustment. For example, the control node 120 may compare the current success rate of the upgrade as determined from the reports to the target success rate. If the target success rate is reached, the control node 120 may stop the repeated multicast transmission configured in the BM-SC 130, end the upgrade campaign. This may also involve initiating the BM-SC 130 to conduct an MBMS session stop procedure as specified in 3GPP TS 23.246. Further, such adjustment may also involve adapting the time schedule of the repeated multicast transmission, e.g., by shifting times of the individual repetitions to another time of the day.

It is to be understood that in the illustrated architecture each component may be capable of handling multiple repeated multicast transmissions in parallel. For example, such multiple repeated multicast transmissions could be used to deliver different data items. Such different repeated multicast transmissions may also differ with respect to the end device to which they are addressed and/or with respect to their managing entity. For example, different fleet managers could use the access over the Internet 160 for managing a software upgrade in their respective fleet of vehicles.

FIG. 2 shows a signaling diagram for illustrating exemplary processes which are based on the above concepts and the architecture of FIG. 1. The processes of FIG. 2 involve the control node 120, the BM-SC 130, the reporting receiver 140, and a plurality of end devices 10. As mentioned in connection with FIG. 1, the end devices 10 may for example correspond to vehicles equipped with communication modules. However, the processes of FIG. 2 are also applicable to other kinds of connected devices, e.g., mobile phones, portable computers, sensors, vending machines, or the like. In the illustrated scenario, the end devices 10 include a first end device (device 1), a second end device (device 2), a third end device (device 3), and a fourth end device (device 4). However, it should be understood that this number is merely for purposes of illustration and that in realistic application scenarios significantly larger number of end devices may be present. In the present example, each of the illustrated end devices 10 may be regarded as being representative of a class of multiple similar devices with the same behavior.

As illustrated by step 200, the control node 120 initiates a repeated multicast transmission of a data item. As mentioned above, the data item may for example include a software upgrade or configuration data. The initiation of the multicast transmission may involve providing the data item to the BM-SC 130 and configuring the BM-SC 130 with a time schedule according to which the repeated multicast transmission is to be performed. The data item may be provided in a data file, which also includes the above-mentioned RTR.

As illustrated by message 201, the control node 120 may also provide information concerning the initiated repeated multicast transmission to the reception receiver 140. For example, this information may include one or more authentication keys to be used for the reporting, may specify a transmission method to be used for the reporting, or may indicate one or more time periods in which such reporting can be expected. By sending the message 201, the control node 120 may also request that the reporting receiver 140 forwards the received reports concerning this repeated multicast transmission to the control node 120.

The BM-SC 130 then sends the multicast transmission 202. This is accomplished via the cellular network (not shown in FIG. 2). As illustrated, the multicast transmission includes the data item 202A and the RTR 202B. The multicast transmission 202 is received by some of the end devices 10, i.e., the first end device 10, the second end device 10, and the fourth end device 10, but not by the third end device 10.

In the illustrated scenario, it is assumed that the RTR 202B specifies a subgroup of devices which shall report successful completion of an action on the basis of the received data item, such as installation of the software upgrade, and that this subgroup includes the first end device, the second end device, and the third end device, but not the fourth end device. This subgroup may for example be specified in terms of a customer service level associated with the end devices 10. For example, the first, second and third end devices 10 may be associated with a premium service level, and the fourth end device 10 may be associated with a non-premium service level.

As illustrated by steps 203, 204, and 205, each of the end devices 10 which has received the multicast transmission 202 then attempts performing the intended action on the basis of the received data item 202A, e.g., to install the software upgrade. In the illustrated scenario, it is assumed that the action is successfully completed by the first end device 10 and by the fourth end device 10. In the case of the second end device 10, the action is not successfully completed, e.g., due to an interruption by a disturbance or by a user.

In accordance with the subgroup and other information specified by the RTR 202B the end devices 10 then send the report to the reporting receiver 140. For example, the RTR 202B may specify a telephone number associated with the reporting receiver 140, and the end devices 10 of the specified subgroup, i.e., the first end device 10 and the second end device 19, may send the report to this telephone number. In particular, the first end device 10 sends a report 206 indicating that the action was successfully completed. As further illustrated, the second end device 10 may in turn send a report 207 indicating a failure of completing the action. The third end device 10 does not send a report because it failed to receive the multicast transmission 202 with the data item and the RTR 202B. The fourth end device 10 does not send a report because it is not a member of the specified subgroup.

The reception receiver 140 collects the reports 206, 207 and forwards a further report 208 to the control node 120. The report 208 may simply forward the reports 206, 207 or aggregate them in a more condensed manner. For example, the report 208 could indicate the current number of successful completions of the action and/or the current number of failures to complete the action.

On the basis of the information in the report 208, the control node 120 takes a decision whether adjustment of the repeated multicast transmission is needed, e.g., because a target success rate was reached, because there is an excessive number of reported failures, or because the increase of the actual success rate after the last multicast transmission 202 is too small, e.g., below a threshold. In the illustrated scenario, it is assumed that the target success rate is not yet reached, so that the control node 120 decides to continue the repeated multicast transmission, however with an adjusted time schedule. By sending message 210 to the BM-SC 130, the control node 120 adjusts the repeated multicast transmission accordingly. For example, message 210 may indicate a new time schedule for the repeated multicast transmission. Such new time schedule may for example avoid failures to complete the action which are due to the end device being switched off while performing the action or by a user interrupting the action because it interferes with a user activity.

The BM-SC 130 then continues with the repeated multicast transmission by sending a further multicast transmission 211 of the data item 202A. As illustrated, this further multicast transmission may also include an RTR 211B, which may be the same as the RTR 202B, but may also differ from the RTR 202B. Accordingly, also the reporting as specified by the RTR may be adjusted for the repeated multicast transmissions.

As illustrated in the scenario of FIG. 2, the further multicast transmission 211 is also received by the third end device 10, which may increase the chances of reaching the target success rate in the next repetition cycle.

Figure 3:
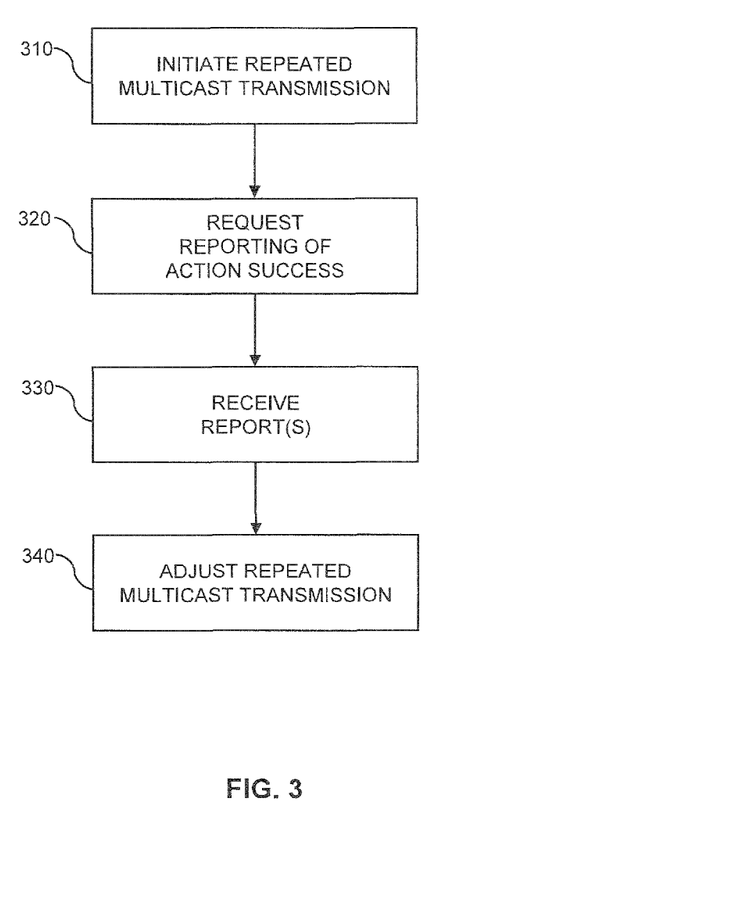
FIG. 3 shows a flowchart for illustrating a method according to an embodiment of the invention, which may be implemented by a network node.

FIG. 3 shows a flowchart for illustrating a method of transmitting a data item. The method of FIG. 3 may be used for implementing the above concepts in a network node, e.g., in the control node 120. If a processor based implementation of the network node is used, the steps of the method may be performed by one or more processors of the network node. For this purpose, the processor(s) may execute correspondingly configured program code. Further, at least some of the corresponding functionalities may be hardwired in the processor(s).

At step 310, the network node initiates a repeated multicast transmission of the data item. The repeated multicast transmission is performed via a cellular network and addressed to a plurality of devices, such as the above-mentioned end devices 10. The multicast transmission may for example be based on MBMS or eMBMS. The multicast transmission may have the purpose of downloading the data item to the devices or of streaming the data item to the devices. The devices may for example be mobile phones, portable computers, vehicles, sensors, vending machines, or other kinds of connected devices.

At step 320, the network node provides a request that at least a subgroup of the devices each send a report indicating whether an action on the basis of the data item received by the device was successfully completed by the device. This request is provided in association with the multicast transmission, e.g., by including the request into the multicast transmission. An example of such request is the above-described RTR.

The data item may include program code, e.g., firmware or software, and the action may involve installation of the program code in the device. In addition or as an alternative, the data item may also include configuration data, and the action may involve configuration of the device with the configuration data. Example of such configuration data are engine mapping data of a vehicle, radio channel data of an entertainment system, map data of a navigation system, or the like. The action may also be execution of one or more commands included in the data item, e.g., commands for deleting data or software.

The request may indicate one or more criteria specifying the subgroup of the devices which are requested to send the report. If the request indicates multiple criteria specifying the subgroup of the devices which are requested to send the report, the request may also indicate one or more logical operators relating the criteria.

Such criteria may include a type of the device, a hardware configuration of the device, a software configuration of the device, an identity of the device, a location of the device, an operating status of the device, e.g., in terms of uptime, a service status of the device, e.g., in terms of time since the last upgrade, a production date of the device, an operator of the device, a manufacturer of the device, and/or a supplier of the device.

The request may also indicate a quota of devices which are requested to send the report. In this way, it can be specified that not all the devices of the subgroup should send the report, but only a certain percentage corresponding to the quota. Further, the request may also indicate one or more conditions for triggering sending of the report. For example, such conditions may specify when or where to send the report. Further, the request may indicate a key for authenticating the report.

The request may also indicate one or more transmission methods for sending the report. Examples of such transmission method are SMS, an IP based transmission method, e.g., using HTTPS, or electronic mail. Further, the request may indicate one or more target addresses for sending the report, e.g., a telephone number for SMS, an IP address, URI, or electronic mail address.

At step 330, the network node may receive one or more reports. These reports may correspond to the reports requested from the devices or may be derived therefrom, e.g., by aggregation in a further network node, such as the above-mentioned reception receiver 140.

At step 340, the network node adjusts the repeated multicast transmission of the data item. This is accomplished depending on the reports requested at step 320. The adjustment of step 340 may for example involve that, depending on the reports, the network node selects between continuing the repeated multicast transmission of the data item and stopping the repeated multicast transmission of the data item. Further, the node may use the reports as a basis for measuring a rate of successful completion of the action and compare the measured rate to a target rate. In response to the measured rate reaching the target rate, the network node may stopping the repeated multicast transmission of the data item.

Figure 4:
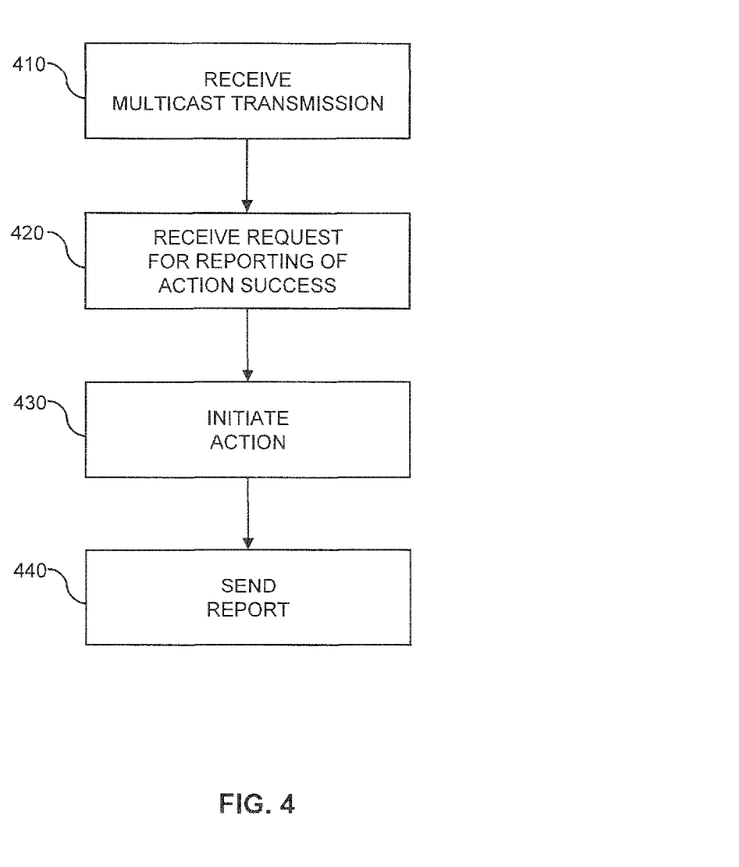
FIG. 4 shows a flowchart for illustrating a method according to an embodiment of the invention, which may be implemented by an end device.

FIG. 4 shows a flowchart for illustrating a further method of transmitting a data item. The method of FIG. 4 may be used for implementing the above concepts in a device, e.g., in one of the end devices 10. The device may for example be a mobile phone, portable computer, vehicle, sensor, vending machine, or other kind of connected device. If a processor based implementation of the device is used, the steps of the method may be performed by one or more processors of the device. For this purpose, the processor(s) may execute correspondingly configured program code. Further, at least some of the corresponding functionalities may be hardwired in the processor(s).

At step 410, the device receives a multicast transmission of the data item via a cellular network. The multicast transmission may be a part of a repeated multicast transmission of the data item, e.g., the initial multicast transmission or a later repetition thereof. The multicast transmission may for example be based on MBMS or eMBMS. The multicast transmission may have the purpose of downloading the data item to the devices or of streaming the data item to the devices.

At step 420, the device receives a request to send a report indicating whether an action on the basis of the received data item was successfully completed by the device. This request is provided in association with the multicast transmission of step 410, e.g., by including the request into the multicast transmission. An example of such request is the above-described RTR.

The data item may include program code, e.g., firmware or software, and the action may involve installation of the program code in the device. In addition or as an alternative, the data item may also include configuration data, and the action may involve configuration of the device with the configuration data. Example of such configuration data are engine mapping data of a vehicle, radio channel data of an entertainment system, map data of a navigation system, or the like. The action may also be execution of one or more commands included in the data item, e.g., commands for deleting data or software.

The request may indicate one or more criteria specifying the subgroup of the devices which are requested to send the report. If the request indicates multiple criteria specifying the subgroup of the devices which are requested to send the report, the request may also indicate one or more logical operators relating the criteria.

Such criteria may include a type of the device, a hardware configuration of the device, a software configuration of the device, an identity of the device, a location of the device, an operating status of the device, e.g., in terms of uptime, a service status of the device, e.g., in terms of time since the last upgrade, a production date of the device, an operator of the device, a manufacturer of the device, and/or a supplier of the device.

The request may also indicate a quota of devices which are requested to send the report. In this way, it can be specified that not all the devices of the subgroup should send the report, but only a certain percentage corresponding to the quota. Further, the request may also indicate one or more conditions for triggering sending of the report. For example, such conditions may specify when or where to send the report. Further, the request may indicate a key for authenticating the report.

The request may also indicate one or more transmission methods for sending the report. Examples of such transmission methods are SMS, an IP based transmission method, e.g., using HTTPS, or electronic mail. Further, the request may indicate one or more target addresses for sending the report, e.g., a telephone number for SMS, an IP address, URI, or electronic mail address. If the request indicates multiple transmission methods and/or target addresses, the request may also indicate how to select one or more of the indicated transmission methods and/or target addresses.

At step 430, the device initiates the action. This may involve that components of the device and/or one or more peripherals connected to the device are controlled to perform the procedure.

At step 440, the device sends the report. This is accomplished depending on whether the action initiated at step 430 was successfully completed. Further, if the request indicates a quota of devices which are requested to send the report, the device may performs the sending of the report depending on the quota. For example, this may involve generating a random number in the range of 0 to 100, comparing the random number to a percent value corresponding to the quota, and sending the report only if the random number does not exceed the percent value. Further, if the request indicates one or more conditions for triggering sending of the report, the device may send the report in response to determining that one or more of the conditions are met. Further, if the request indicates a key for authenticating the report, the device may generate the report on the basis of the key, e.g., by encrypting or signing the report with the key, signing or encrypting a device-specific secret and the report, signing and encrypting the report and a device-specific secret attached to the report, or consider the key as a challenge as part of a challenge-response authentication for which the report needs to contain a matching response or a matching response attached to the report.

If the request indicates one or more transmission methods for sending the report, the device may utilize one or more of the indicated transmissions method to send the report. If the request indicates one or more target addresses for sending the report, the device may send the report to one or more of the indicated target addresses indicated in the request. If the request indicates multiple transmission methods and/or target addresses, the device may also select one or more of the indicated transmission methods and/or target addresses, e.g., according to information indicated in the request.

It is to be understood that the methods of FIGS. 3 and 4 may be combined in a system which includes a network node operating according to the method of FIG. 3 and one or more devices operating according to the method of FIG. 4.

Figure 5:
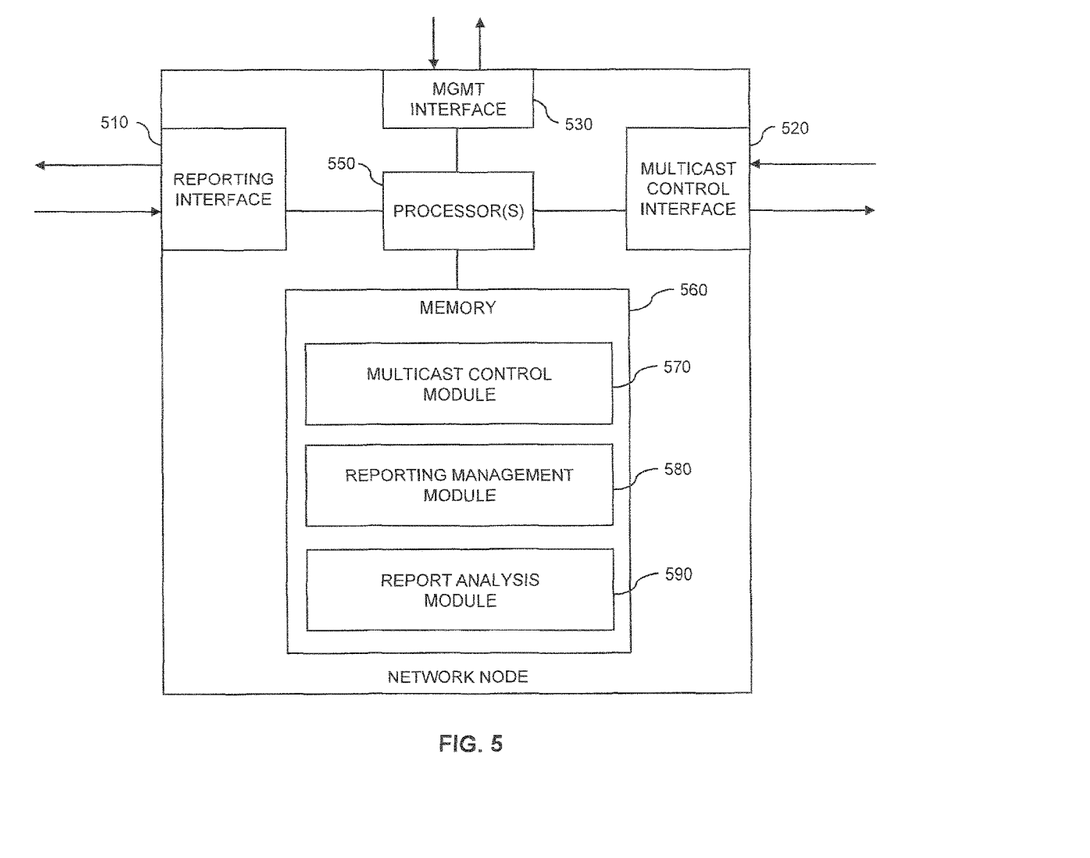
FIG. 5 schematically illustrates structures of a network node according to an embodiment of the invention.

FIG. 5 illustrates exemplary structures for implementing a network node which operates in accordance with the above concepts. For example, the illustrated structures may be used to implement the control node 120.

In the illustrated example, the network node includes a reporting interface 510 for receiving the above-described reports, e.g., from the reporting receiver or from the end devices. Further, the network node includes a multicast control interface 520 for controlling the repeated multicast transmission, e.g., by communication with the BM-SC 120. Further, the network node includes a management interface 530 for configuring the repeated multicast transmission, e.g., through IP based access as explained in connection with FIG. 1.

Further, the network node includes one or more processor(s) 550 coupled to the interfaces 510, 520 and 530, and a memory 560 coupled to the processor(s) 550. The memory 560 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 560 includes suitably configured program code modules to be executed by the processor(s) 550 so as to implement the above-described functionalities of the network node in the method of FIG. 3, in particular functionalities as described to be performed by the control node 120. More specifically, the program code modules in the memory 560 may include a multicast control module 570 so as to implement the above-described functionalities of initiating and adjusting a repeated multicast transmission. This may also involve deciding between continuing the repeated multicast transmission or stopping the repeated multicast transmission. Further, the program code modules in the memory 560 may include a reporting management module 580 so as to implement the above-described functionalities of providing the RTR or similar request and thereby specify the reporting which shall be done in relation to the action performed on the received data item. Still further, the memory 560 may include a report analysis module 590 so as to implement the above-mentioned functionalities of measuring success rates or the like on the basis of the requested reports and comparing such measured rates to target rates.

It is to be understood that the structures as illustrated in FIG. 5 are merely schematic and that the network node may actually include further components which, for the sake of clarity, have not been illustrated, e.g., further interfaces or further processors. Also, it is to be understood that the memory 560 may include further types of program code modules, which have not been illustrated, e.g., program code modules for implementing known functionalities of a node used for content provision in MBMS or eMBMS. In some implementations, also a computer program may be provided for implementing functionalities of the network node, e.g., in the form of a physical medium storing the program code modules to be stored in the memory 560 or by making such program code available for download or streaming.

Figure 6:
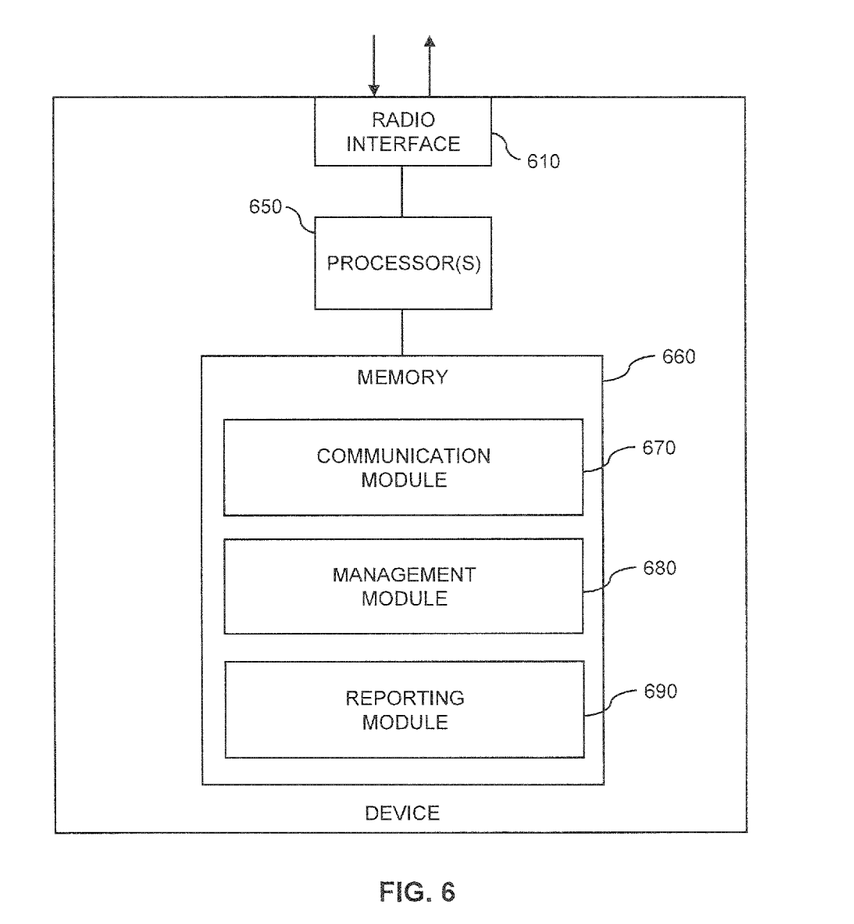
FIG. 6 schematically illustrates structures of an end device network node according to an embodiment of the invention.

FIG. 6 illustrates exemplary structures for implementing a device which operates in accordance with the above concepts. For example, the illustrated structures may be used to implement one of the end devices 10. If the end device is a vehicle as in the scenario of FIG. 1, the structures may be used for implementing a communication module of the vehicle.

In the illustrated example, the device includes a radio interface 610 for communication with a cellular network. Further, the device includes one or more processor(s) 650 coupled to the interface 610, and a memory 660 coupled to the processor(s) 650. The memory 660 may include a ROM, e.g., a flash ROM, a RAM, e.g., a DRAM or SRAM, a mass storage, e.g., a hard disk or solid state disk, or the like. The memory 660 includes suitably configured program code modules to be executed by the processor(s) 650 so as to implement the above-described functionalities of an end device. More specifically, the program code modules in the memory 660 may include a communication module 670 so as to implement the above-described functionalities of receiving multicast transmissions and sending reports. Further, the program code modules in the memory 660 may include a management module 680 so as to implement the above-described functionalities of performing the action on the basis of the received data item, e.g., installation of program code or configuration of the device. Still further, the memory 660 may include a reporting module 690 so as to implement the above-described functionalities of controlling the generation and sending of the report.

It is to be understood that the structures as illustrated in FIG. 6 are merely schematic and that the device may actually include further components which, for the sake of clarity, have not been illustrated, e.g., further interfaces or further processors. Also, it is to be understood that the memory 660 may include further types of program code modules, which have not been illustrated, e.g., program code modules for implementing known functionalities of the above-mentioned types of end devices. In some implementations, also a computer program may be provided for implementing functionalities of the device, e.g., in the form of a physical medium storing the program code modules to be stored in the memory 660 or by making such program code available for download or streaming.

As can be seen, the concepts as described above may be used for efficiently delivering a data item by repeated multicast transmission. In particular, the repeated multicast transmission can be adjusted depending on the feedback provided by the reports, and such adjustment may take into account the actual success of an action which is to be performed on the basis of the data item.

It is to be understood that the examples and embodiments as explained above are merely illustrative and susceptible to various modifications. For example, the selection criteria in the RTR could not only be used to select which devices shall send the report, but also be used to select for which devices a the data item is applicable, i.e., which devices should perform the action intended for this data item. Further, the RTR could be used to define further actions which shall be performed by the devices, e.g., specifying non-mandatory updates, requesting devices to delete some data or firmware, requesting devices to run some diagnostics and report the result, or the like.

Instead of explicitly specifying selection criteria in the RTR, such criteria can be implicit. For example, the end devices could be configured with a policy that a device having a last serial number digit matches the last number of a checksum of the data item is required to send the report. The selection criteria could also be hard coded in at least some of the end devices. For example, at manufacture or provisioning the end device could be configured to be either a device which shall send the report or a device which shall not send the report. Further, the concepts may be combined with various security mechanisms for authentication of the reports or other messages.

The concepts may also be modified with respect to the described transmission methods for sending the report. For example, such transmission methods could rely on an interface of the end device which is different from the cellular radio interface, e.g., another wireless interface such as Wireless Local Area Network (WLAN) or Bluetooth or a wire-based interface, such as Universal Serial Bus (USB) or Ethernet.

Further, the concepts may be combined with various techniques for reducing the probability of overloading the cellular network or the reporting receiver. For example, instead immediately sending the report, the end devices could delay the sending of the report by a random amount of time. In such case, the maximum delay time could be hard-coded in the end devices or could be indicated in the RTR.

Further, the illustrated concepts could be used in connection with various types of cellular network technologies, without limitation to the above-mentioned LTE or UMTS technologies and MBMS or eMBMS. Moreover, it is to be understood that the above concepts may be implemented by using correspondingly designed software to be executed by one or more processors of an existing device or network node, or by using dedicated hardware.

The invention claimed is:

1. A method of transmitting a data item, the method being performed by a network node and comprising:
   initiating a repeated multicast transmission of the data item via a cellular network to a plurality of devices;
   associated with the repeated multicast transmission, providing a request that at least a subgroup of the devices each send a report indicating whether an action based on the data item received by the device was successfully completed by the device, wherein the request is included in the repeated multicast transmission, and wherein the action comprises configuration of the corresponding device with configuration data comprised in the data item and/or execution of one or more non-software updating commands included in the data item; and
   depending on the reports, adjusting the repeated multicast transmission of the data item.

2. The method of claim 1, further comprising the network node, depending on the reports, selecting between continuing the repeated multicast transmission of the data item and stopping the repeated multicast transmission of the data item.

3. The method of claim 1, further comprising the network node:
   measuring a rate of successful completion of the action based on the reports;
   comparing the measured rate to a target rate; and
   stopping the repeated multicast transmission of the data item in response to the measured rate reaching the target rate.

4. The method of claim 1, wherein the request indicates one or more criteria specifying the subgroup of the devices which are requested to send the report.

5. The method of claim 4, wherein the request indicates multiple criteria specifying the subgroup of the devices which are requested to send the report and one or more logical operators relating the criteria.

6. The method of claim 4, wherein the one or more criteria comprise one or more of: a type of the device, a hardware configuration of the device, a software configuration of the device, an identity of the device, a location of the device, an operating status of the device, a service status of the device, a production date of the device, an operator of the device, a supplier of the device.

7. The method of claim 1, wherein the request indicates one or more of:
   a quota of devices which are requested to send the report;

one or more conditions for triggering sending of the report;

a key for authenticating the report;

a transmission method for sending the report;

a target address for sending the report.

8. A method associated with receiving a data item, the method being performed by a device and comprising:

receiving a multicast transmission of the data item via a cellular network;

associated with the multicast transmission, receiving a request to send a report indicating whether an action based on the received data item was successfully completed by the device, wherein the request is included in the multicast transmission, and wherein the action comprises configuration of the corresponding device with configuration data comprised in the data item and/or execution of one or more non-software updating commands included in the data item;

initiating the action; and depending on whether the action was successfully completed, sending the report.

9. The method of claim 8:

wherein the request indicates one or more criteria specifying a subgroup of devices which are requested to send the report; and wherein the device sends the report in response to determining that it is a member of the subgroup.

10. The method of claim 9, wherein the request indicates multiple criteria specifying the subgroup of devices which are requested to send the report and one or more logical operators relating the criteria.

11. The method of claim 9, wherein the one or more criteria comprise one or more of: a type of the device, a hardware configuration of the device, a software configuration of the device, an identity of the device, a location of the device, an operating status of the device, a service status of the device, a production date of the device, an operator of the device, a supplier of the device.

12. The method of claim 8, wherein:

the request indicates a quota of devices which are requested to send the report; and the device performs the sending of the report depending on the quota.

13. The method of claim 8, wherein:

the request indicates one or more conditions for triggering sending of the report; and the device sends the report in response to determining that one or more of the conditions are met.

14. The method of claim 8, wherein:

the request indicates a key for authenticating the report; and the device generates the report based on the key.

15. The method of claim 8, wherein:

the request indicates one or more transmission methods for sending the report; and the device utilizes one or more of the indicated transmission methods to send the report.

16. The method of claim 8, wherein:

the request indicates one or more target addresses for sending the report; and the device sends the report to one or more of the target addresses indicated in the request.

17. A network node, comprising:

at least one interface with respect to one or more nodes of a cellular network; and at least one processor;

memory containing instructions executable by the at least one processor whereby the network node is operative to:

initiate a repeated multicast transmission of a data item via the cellular network to a plurality of devices;

associated with the repeated multicast transmission, provide a request that at least a subgroup of the devices each send a report indicating whether an action based on the data item received by the device was successfully completed by the device, wherein the request is included in the repeated multicast transmission, and wherein the action comprises configuration of the corresponding device with configuration data comprised in the data item and/or execution of one or more non-software updating commands included in the data item; and depending on the reports, adjust the repeated multicast transmission of the data item.

18. A device, comprising:

an interface for communication with a cellular network; and at least one processor;

memory containing instructions executable by the at least one processor whereby the network node is operative to:

receive a multicast transmission of a data item via a cellular network;

associated with the multicast transmission, receive a request to send a report indicating whether an action based on the received data item was successfully completed by the device, wherein the request is included in the multicast transmission, and wherein the action comprises configuration of the corresponding device with configuration data comprised in the data item and/or execution of one or more non-software updating commands included in the data item;

initiate the action; and depending on whether the action was successfully completed, send the report.

19. A computer program product stored in a non-transitory computer readable medium for controlling transmission of a data item, the computer program product comprising software instructions which, when run on one or more processors of a network node, causes the network node to:

initiate a repeated multicast transmission of the data item via a cellular network to a plurality of devices;

associated with the repeated multicast transmission, provide a request that at least a subgroup of the devices each send a report indicating whether an action based on the data item received by the device was successfully completed by the device, wherein the request is included in the repeated multicast transmission, and wherein the action comprises configuration of the corresponding device with configuration data comprised in the data item and/or execution of one or more non-software updating commands included in the data item; and depending on the reports, adjust the repeated multicast transmission of the data item.

20. A computer program product stored in a non-transitory computer readable medium for controlling one or more processors of a device, the computer program product comprising software instructions which, when run on the one or more processors, causes the device to:

receive a multicast transmission of the data item via a cellular network;

associated with the multicast transmission, receive a request to send a report indicating whether an action on the basis of the received data item was successfully completed by the device, wherein the request is included in the multicast transmission, and wherein the action comprises configuration of the corresponding device with configuration data comprised in the data item and/or execution of one or more non-software updating commands included in the data item;

initiate the action; and depending on whether the action was successfully completed, send the report.

* * * * *